US010152329B2

(12) United States Patent
Fetterman et al.

(10) Patent No.: US 10,152,329 B2
(45) Date of Patent: Dec. 11, 2018

(54) PRE-SCHEDULED REPLAYS OF DIVERGENT OPERATIONS

(75) Inventors: Michael Fetterman, Boxborough, MA (US); Stewart Glenn Carlton, Madison, AL (US); Jack Hilaire Choquette, Palo Alto, CA (US); Shirish Gadre, Fremont, CA (US); Olivier Giroux, San Jose, CA (US); Douglas J. Hahn, Los Altos, CA (US); Steven James Heinrich, Madison, AL (US); Eric Lyell Hill, Palo Alto, CA (US); Charles McCarver, Madison, AL (US); Omkar Paranjape, Austin, TX (US); Anjana Rajendran, San Jose, CA (US); Rajeshwaran Selvanesan, Milpitas, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1205 days.

(21) Appl. No.: 13/370,173

(22) Filed: Feb. 9, 2012

(65) Prior Publication Data

US 2013/0212364 A1    Aug. 15, 2013

(51) Int. Cl.
    *G06F 9/38*    (2018.01)
(52) U.S. Cl.
    CPC .......... *G06F 9/3861* (2013.01); *G06F 9/3836* (2013.01); *G06F 9/3851* (2013.01); *G06F 9/3887* (2013.01)
(58) Field of Classification Search
    CPC .. G06F 9/3887; G06F 9/3885; G06F 9/30036; G06F 9/30032; G06F 15/8007
    (Continued)

(56) References Cited

U.S. PATENT DOCUMENTS 7,788,468 B1 *  8/2010  Nickolls et al. ............... 712/22
8,438,370 B1 *  5/2013  Budge ........................ 712/241
(Continued)

FOREIGN PATENT DOCUMENTS

TW    200506715 A    2/2005

OTHER PUBLICATIONS

Reddy et al., "Understanding Prediction-Based Partial Redundant Threading for Low-Overhead, High-Coverage Fault Tolerance", Oct. 21-25, 2006, ASPLOS XII Proceedings of the 12th international conference on Architectural support for programming languages and operating systems, pp. 83-94.*
(Continued)

*Primary Examiner* — John M Lindlof
(74) *Attorney, Agent, or Firm* — Artegis Law Group, LLP (57) ABSTRACT

One embodiment of the present disclosure sets forth an optimized way to execute pre-scheduled replay operations for divergent operations in a parallel processing subsystem. Specifically, a streaming multiprocessor (SM) includes a multi-stage pipeline configured to insert pre-scheduled replay operations into a multi-stage pipeline. A pre-scheduled replay unit detects whether the operation associated with the current instruction is accessing a common resource. If the threads are accessing data which are distributed across multiple cache lines, then the pre-scheduled replay unit inserts pre-scheduled replay operations behind the current instruction. The multi-stage pipeline executes the instruction and the associated pre-scheduled replay operations sequentially. If additional threads remain unserviced after execution of the instruction and the pre-scheduled replay operations, then additional replay operations are inserted via the replay loop, until all threads are serviced. One advantage of the disclosed technique is that divergent operations requiring one or more replay operations execute with reduced latency.

21 Claims, 7 Drawing Sheets

(58) Field of Classification Search
USPC ............... 712/22, 10, 11, 21, 234, E09.062, 712/E09.033
See application file for complete search history.

(56) References Cited

U.S. PATENT DOCUMENTS

| | | | |
|---|---|---|---|
| 8,612,732 B2* | 12/2013 | Grover et al. | ................ 712/241 |
| 2002/0091914 A1 | 7/2002 | Merchant et al. | |
| 2004/0172523 A1 | 9/2004 | Merchant et al. | |
| 2009/0024838 A1 | 1/2009 | Dhodapkar et al. | |
| 2009/0240931 A1* | 9/2009 | Coon et al. | ................... 712/234 |
| 2010/0262781 A1 | 10/2010 | Hrusecky et al. | |
| 2011/0078358 A1 | 3/2011 | Shebanow | |
| 2012/0089792 A1* | 4/2012 | Fahs et al. | .................... 711/154 |
| 2012/0110586 A1* | 5/2012 | Coon et al. | ................... 718/102 |
| 2013/0138926 A1* | 5/2013 | Coon et al. | ................... 712/220 |
| 2013/0159684 A1* | 6/2013 | Fetterman et al. | ........... 712/233 |
| 2013/0179662 A1* | 7/2013 | Choquette et al. | ........... 712/206 |
| 2013/0311686 A1* | 11/2013 | Fetterman et al. | ............. 710/54 |
| 2013/0311996 A1* | 11/2013 | Fetterman et al. | ........... 718/102 |
| 2013/0311999 A1* | 11/2013 | Fetterman et al. | ........... 718/104 |

OTHER PUBLICATIONS

Batten et al., "Cache Refill/Access Decoupling for Vector Machines", MIT Computer Science and Artificial Intellegence Laboratory, The Stata Center, IEEE Computer Society, Proceedings of the 37th International Symposium on Microarchitecture.

Sylvain Collange, "Multi-threading or SIMD? How GPU Architectures exploit regularity", ARCH'11, Jun. 14, 2011.

\* cited by examiner

PRE-SCHEDULED REPLAYS OF DIVERGENT OPERATIONS

BACKGROUND OF THE INVENTION

Field of the Invention

The present invention generally relates to computer architectures and, more specifically, to pre-scheduled replays of divergent operations.

Description of the Related Art

A common practice in parallel processing systems is to design a processor that executes some number of threads simultaneously. Each thread may execute in a separate execution pipeline within the processor. When such threads all need to execute the same instruction sequence (typically with different data for each thread), there are tangible benefits to sharing the control structures of the threads. For example, only one instruction has to be fetched, and all threads then execute that same instruction. This type of operation may be found on single instruction multi-thread (SIMT) processors and single instruction multi-data (SIMD) processors.

As execution proceeds in parallel, different threads may access a common resource, such as a shared memory, in a manner that may cause the threads to encounter a resource conflict. For example, the threads may execute a common resource access operation, such as a memory load instruction, where the set of memory locations spans over two or more cache lines. Such a load instruction may be called a "divergent" operation because the memory locations required by the various threads are on divergent cache lines. In such situations, the pipeline transfers data from one of the cache lines that some of the threads are accessing, and those threads are able to complete the common resource access operation. However, the other threads pointing to locations within a different cache line are not able to complete the common resource access operation and remain unserviced. Thus, with a single pass through the pipeline, some threads are able to complete the common resource access operation while other threads are not. Absent a means to process multiple execution cycles, the operation is not able to complete successfully.

One approach to implementing multiple execution cycles is to reinsert the instruction into the prior stage of the processing pipeline and execute the load instruction again for the threads that were not able to access data from their target memory address locations. Such a technique is called a "replay" operation. In essence, where a stage in the pipeline performs an operation that cannot be completed in the current cycle, the pipeline "replays" the load instruction once for each cache line that includes at least one target address until each thread performs the relevant common resource access operation. During this process, a portion of the pipeline is utilized to complete the replay operations. Therefore, the pipeline is stalled to prevent new instructions from entering the pipeline until all replay operations have been completed. One drawback of this approach is that the pipeline is stalled until all replay operations complete. Upstream instructions may not advance in the pipeline until the pipeline stall is released, which reduces overall system performance. An additional drawback is that the parallel processing system may not be able to stall all pipeline stages within one pipeline stage delay. If the parallel processing system cannot stall the pipeline in time, then one or more new instructions entering the pipeline may be improperly discarded or the replay operation is likewise discarded. In either case, the new instruction or the replay operation does not properly complete.

Another approach to implementing multiple execution cycles is to reinsert the instruction farther back in the pipeline. With this approach, the instructions being "replayed" are interleaved in the pipeline along with new instructions, which reduces the frequency of pipeline stalls, thereby increasing pipeline performance. One drawback of this approach, however, is increased latency of the instructions being replayed. For example, consider a processor with 32 simultaneously executing threads. In a divergent load operation, the target address locations for the 32 threads may diverge across 32 different cache lines. If a replay operation is inserted one pipeline stage back, then the pipeline may stall for 31 pipeline cycles while the 31 replay operations execute. Inserting the replay operation five pipeline stages back increases the latency for the instructions being replayed to five pipeline stages multiplied by 31 replay operations or 155 pipeline cycles.

As the foregoing illustrates, what is needed in the art is a more efficient way to execute replay operations for divergent operations.

SUMMARY OF THE INVENTION

One embodiment of the present invention sets forth a computer-implemented method for pre-scheduling replays of common resource access operations. A streaming multi-processor (SM) receives an instruction that is to be executed by a group of threads in a multi-stage pipeline. The SM determines that a pre-scheduled replay operation should be inserted into the multi-stage pipeline to allow a second set of one or more threads from the group of threads to execute the instruction. The SM selects a first set of one or more threads from the group of threads to execute the instruction in the multi-stage pipeline. The SM inserts the instruction into the multi-stage pipeline for execution by the first set of one or more threads. The SM inserts the pre-scheduled replay operation into the multi-stage pipeline to allow the second set of one or more threads to execute the first instruction. The first set of one or more threads is intended to access a first aspect or portion of a common resource, and the second set of one or more threads is intended to access a second aspect or portion of the common resource.

One advantage of the disclosed technique is that divergent operations requiring one or more replay operations execute with reduced latency. Further, the multi-stage pipeline is utilized more efficiently because one or more pre-scheduled replay operations progress through the replay loop serially along with original instructions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
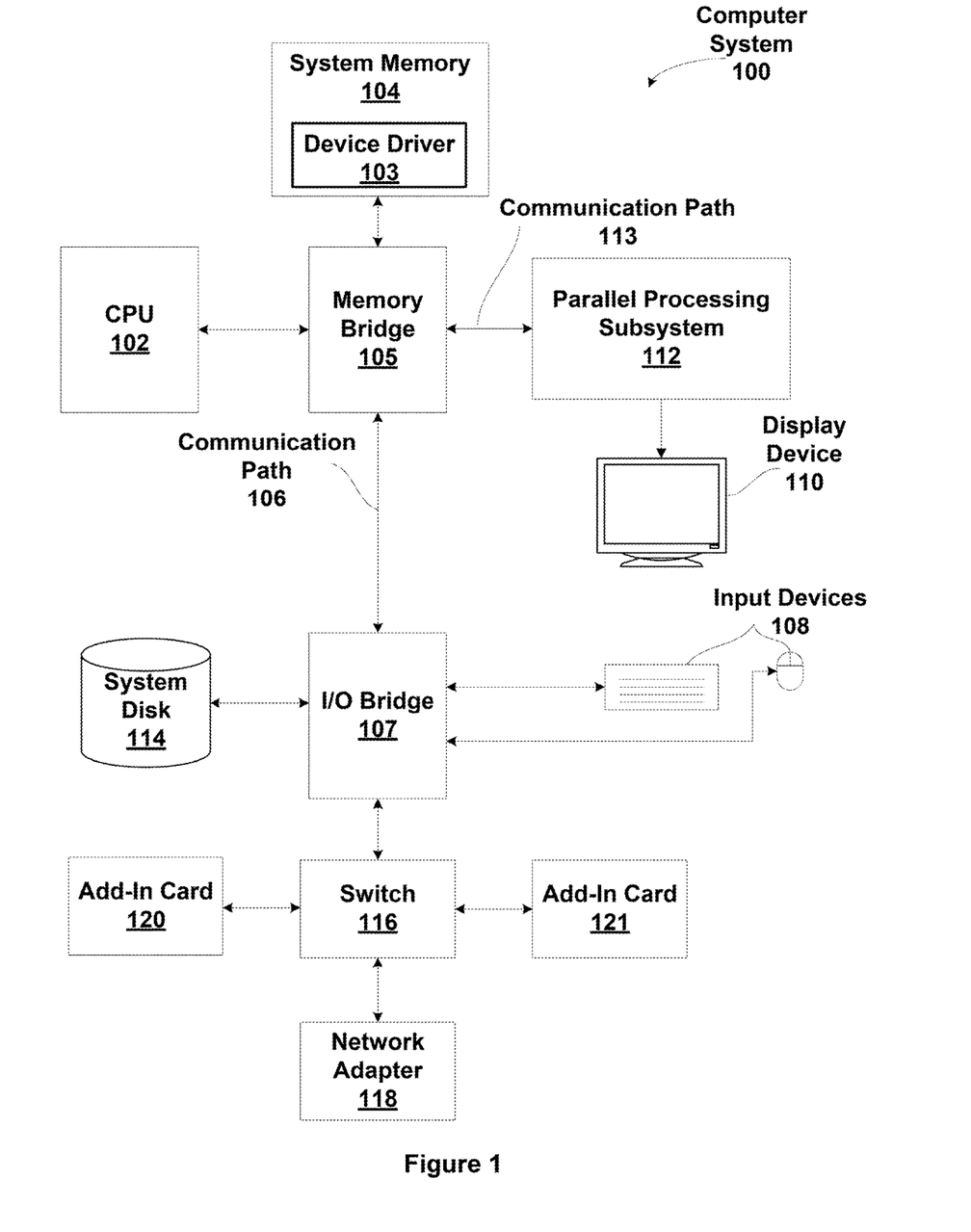
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
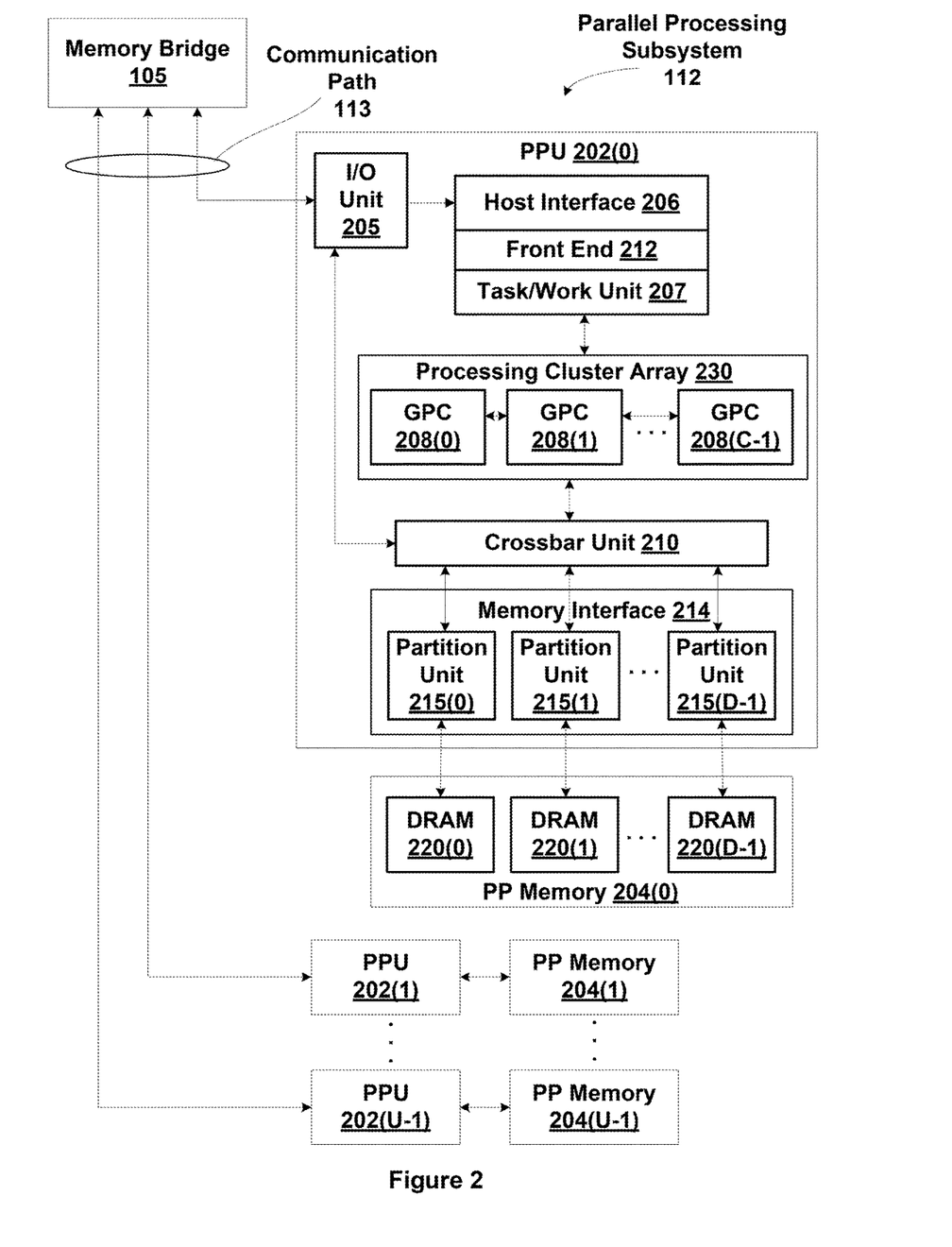
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
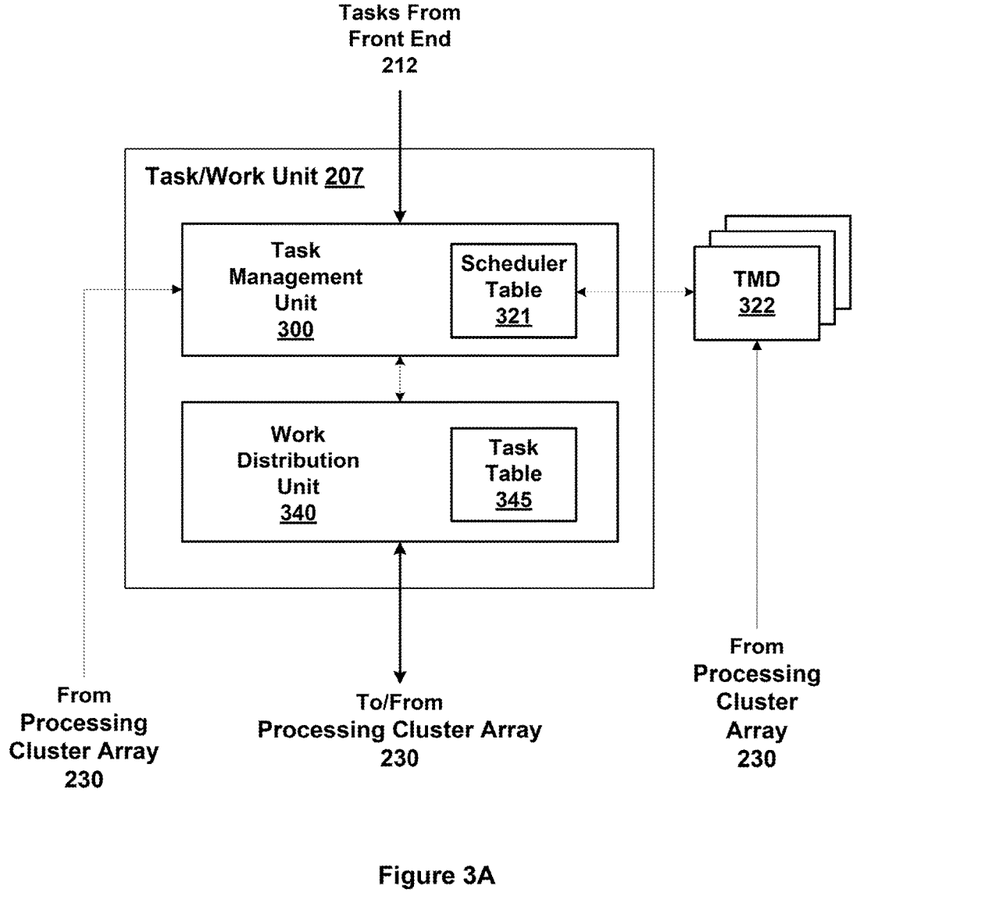
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
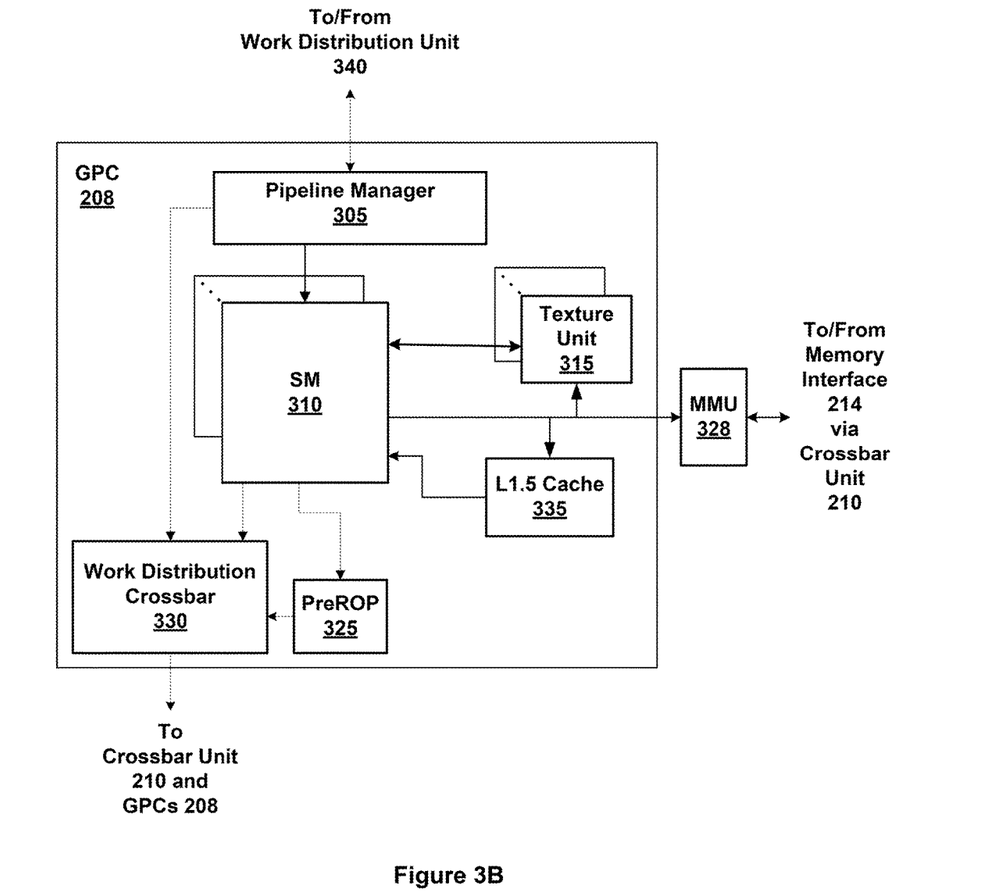
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
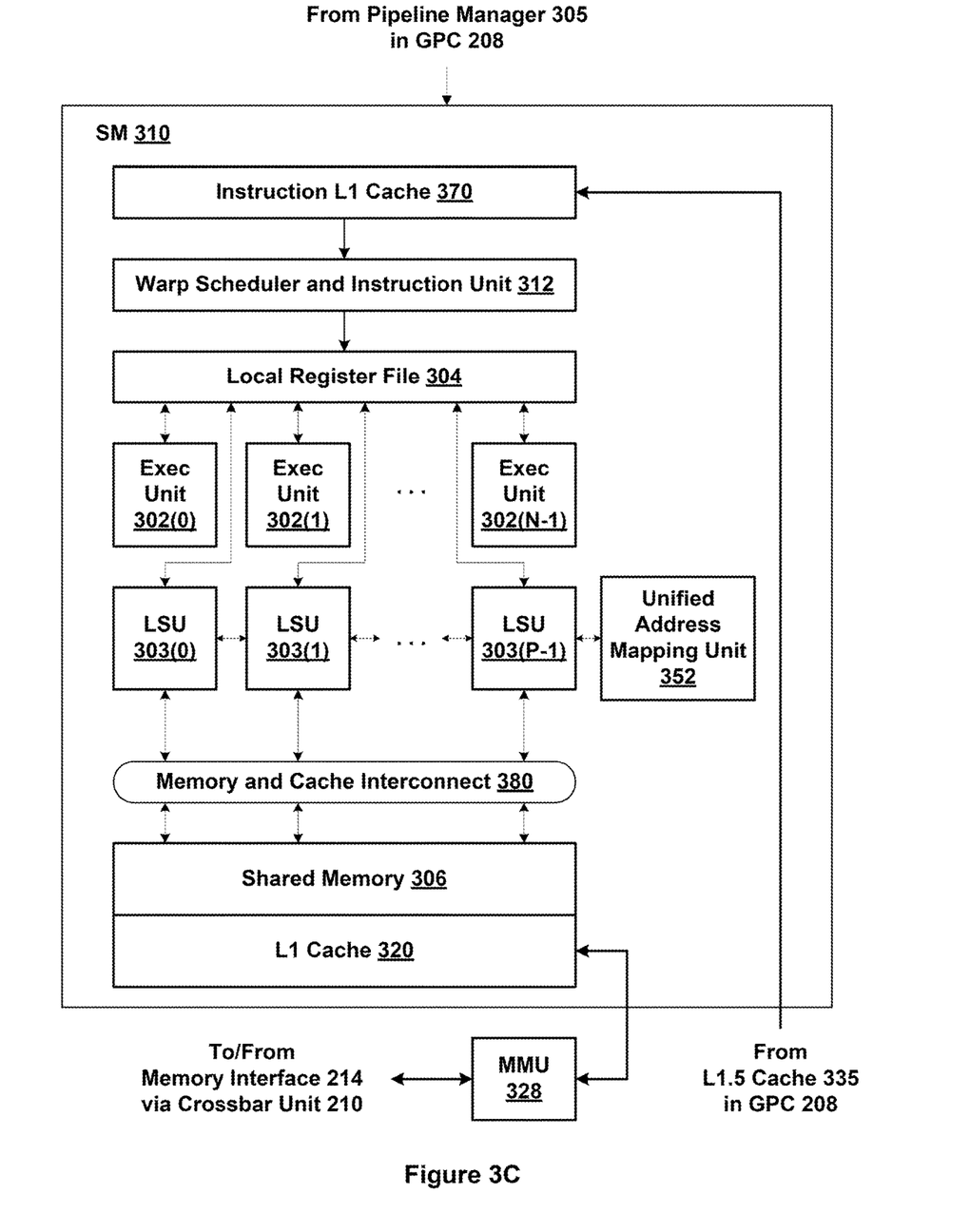
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Pre-Scheduled Replay of Divergent Operations

Figure 4:
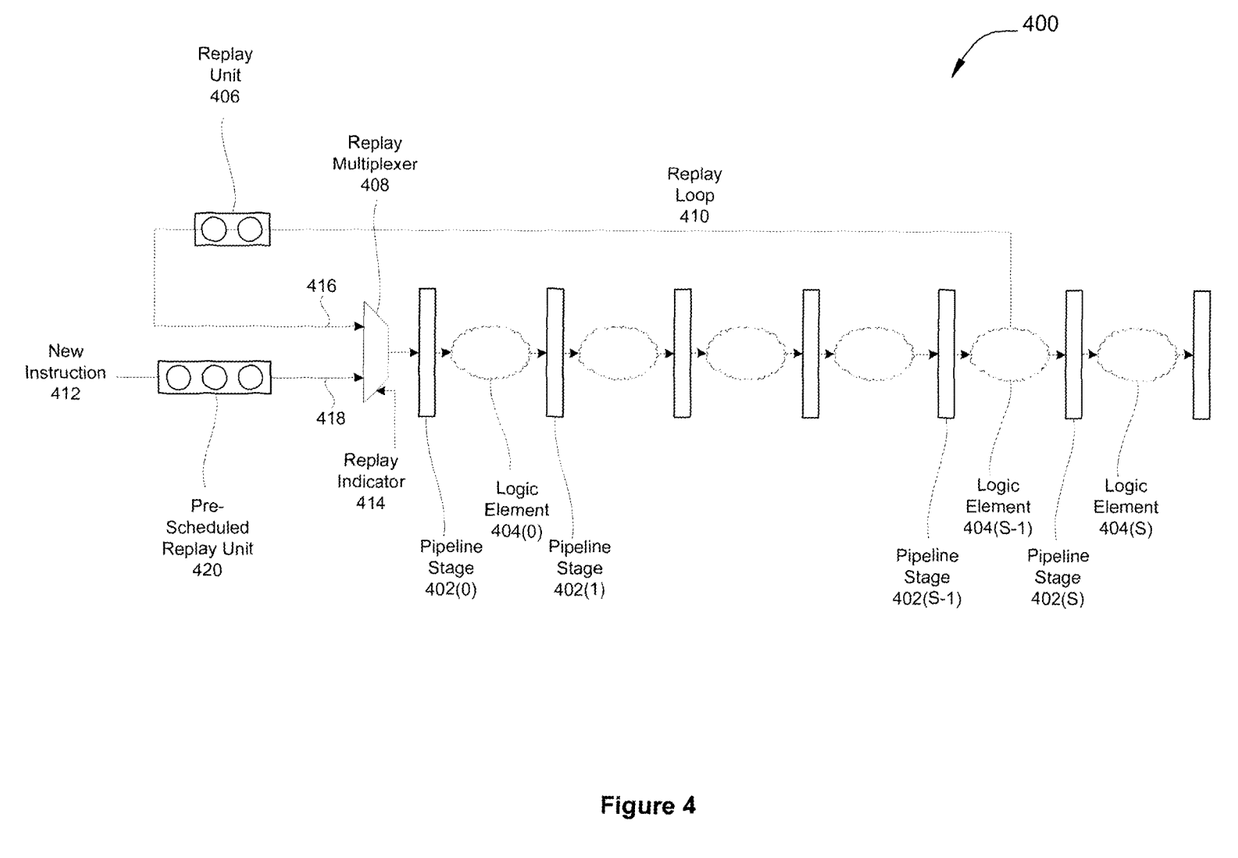
FIG. 4 illustrates a multi-stage pipeline configured to implement pre-scheduled replays of divergent operations, according to one embodiment of the present invention.

FIG. 4 illustrates a multi-stage pipeline 400 configured to implement pre-scheduled replays of divergent operations, according to one embodiment of the present invention. As shown, the multi-stage pipeline 400 includes a pre-scheduled replay unit 420, pipeline stages 402, logic elements 404, a replay unit 406, and a replay multiplexer 408. In various implementations, the multi-stage pipeline 400 may reside within an Exec Unit 302 or an LSU 303 of the streaming multiprocessor (SM) 310, as shown in FIG. 3C.

The pre-scheduled replay unit 420 receives a new instruction 412 as the instruction enters the multi-stage pipeline 400. When a new instruction 412 enters the multi-stage pipeline 400, the Exec Unit 302 determines whether the instruction is a common resource access operation which may benefit from using pre-scheduled replay operations. If the new instruction 412 is a common resource access operation, then the LSU 303 selects a first thread from among the group of threads scheduled to execute the instruction. The LSU 303 selects a group of threads associated with the first thread, where the group of threads may all complete the common resource access operation within a single execution pass of the multi-stage pipeline 400. Such a group of threads is identified herein as a thread family. The thread family associated with the first thread may be selected concurrently with selecting the first thread, or the thread family may be determined at a later time. The LSU 303 then selects one or more additional threads to process during the initial pass through the multi-stage pipeline 400. The additional threads are selected on the basis that they may remain unserviced after the instruction is executed for the first thread and first thread family. The LSU 303 selects thread families associated with each of the additional threads. The thread family associated with each additional thread may be selected concurrently with selecting the additional threads, or the thread families may be determined at a later time. Up to B operations may be selected for processing during the initial pass, where B includes the initial instruction for the first thread and the pre-scheduled replay operations for the additional selected threads. The Exec Unit 302 inserts an operation into the multi-stage pipeline, via the pre-scheduled replay unit 420, to execute the instruction for the first thread and the first thread family. Once the initial operation associated with the first thread reaches pipeline stage 402(0), the Exec Unit 302 inserts, via the pre-scheduled replay unit 420, the pre-scheduled replay operations associated with the additional threads serially with the initial operation.

Pipeline stages 402 store intermediate results for various instructions as they progress through multi-stage pipeline 400. The pipeline stages 402 store the intermediate results at the beginning of each clock cycle of the multi-stage pipeline 400. Multiple instructions may be present in the multi-stage pipeline 400 at various stages of progress. For example, an instruction enters the multi-stage pipeline 400 and is stored into pipeline stage 402(0) at the beginning of a specific clock cycle. At the beginning of the next clock cycle, this instruction progresses to pipeline stage 402(1) while another instruction enters the multi-stage pipeline 400 and is stored into pipeline stage 402(0). Each instruction typically progresses one pipeline stage 402 for every clock cycle of the multi-stage pipeline 400.

Logic elements 404 separate the pipeline stages 402. Logic elements 404 may perform any function required by the SM 310 including, without limitation, arithmetic operations, logical operations, and load/store operations. For example, an instruction stored into pipeline stage 402(0) is presented as an input to logic element 404(0). After a period of delay, the output of logic element 404(0) is presented as a functional result to the input of pipeline stage 402(1). This result is then stored in pipeline stage 402(1) at the next clock cycle of the multi-stage pipeline 400. In this fashion, the instruction performs the various functions determined by the logic elements 404 as the instruction progresses along the pipeline stages 402. The instruction proceeds through the multi-stage pipeline 400 with each clock cycle until the instruction has passed through all pipeline stages 402. In general, the total latency through the multi-stage pipeline 400 is equal to the number of pipeline stages 402 within the multi-stage pipeline 400 multiplied by the time period between successive pipeline clock cycles. The delay through the logic elements 404 is typically low in order to minimize the clock cycle time to the pipeline stages 402, thereby maximizing pipeline performance. Once the instruction reaches pipeline stage 402(S−1), the LSU 303 determines that the instruction is accessing a common resource, such as an instruction to access a memory location stored within a cache. The LSU 303 transfers a cache line referenced by at least one thread and services all threads that are accessing the same cache line. If a pre-scheduled replay operation associated with the instruction has been inserted into the multi-stage pipeline 400, then the LSU 303 transfers a cache line referenced by at least one thread referenced in the pre-scheduled replay operation and services all threads that are accessing the same cache line. The LSU 303 repeats the process for any other pre-scheduled replay operation associated with the instruction. If some threads remain unserviced after processing the instruction and pre-scheduled replay operations, then the LSU 303 prepares additional replay operations as required and passes the replay operations to the replay unit 406 via the replay loop 410.

The replay unit 406 receives replay operations via replay loop 410 and inserts the different replay operations back into the multithreaded pipeline 400. Replay operations are implemented for a divergent common resource where one or more threads remain unserviced after processing the initial operation corresponding to a common resource access instruction and any associated pre-scheduled replay operations. In such a case, the replay unit 406 inserts one or more replay operations into the multi-stage pipeline 400 via input 416 of replay multiplexer 408. The replay operations proceed through the multi-stage pipeline 400. Once a replay operation reaches logic element 404(S−1), the LSU 303 determines whether any unserviced threads remain. If there are any unserviced threads, then the LSU 303 prepares one or more replay operations in the manner discussed above until all threads associated with a given instruction have been serviced.

The replay multiplexer 408 selects whether new instructions 412 or replay operations are allowed to enter the multi-stage pipeline 400 at pipeline stage 402(0). The replay multiplexer 408 is controlled by the replay indicator 414. Initially, the replay indicator 414 is set to select input 418 of the replay multiplexer 408. An incoming new instruction 412 passes through the pre-scheduled replay unit 420, to input 418 of the replay multiplexer 408, and then to the input of the first pipeline stage 402(0). As described above, if the LSU 303 detects a divergent operation, then one or more replay operations may be required in order to complete the instruction across all threads. The Exec Unit 302 allows pre-scheduled replay operations, if any, from the pre-scheduled replay unit 420 to be inserted into the multi-stage pipeline 400 via input 418 of the replay multiplexer 408. If threads remain unserviced after processing the initial operation and associated pre-scheduled operations, then the LSU 303 asserts the replay indicator 414 to select input 416 of the replay multiplexer 408. In response, one or more replay operations from the replay unit 406 pass through the replay loop 410, to input 416 of the replay multiplexer 408, and then to the input of the first pipeline stage 402(0). Once the replay operations have entered the multi-stage pipeline 400, the LSU 303 may remove the replay indicator 414, allowing new instructions 412 to again enter the multi-stage pipeline 400 via input 418 of the replay multiplexer 408. Once a replay operation has been processed through the multi-stage pipeline 400, the LSU 303 determines whether all threads have been serviced. If some threads remain unserviced, then the LSU 303 asserts the replay indicator 414, passes another replay operation through the replay loop 410, and then removes the replay indicator 414. The process continues until all threads are serviced, that is, all threads have executed the instruction associated with the common resource access operation.

The new instruction 412 may complete execution for all threads during execution of the initial operation, during execution of one of the pre-scheduled replay operations, or later. For example, once the initial operation associated with the first thread and the corresponding thread family is processed, the LSU 303 may determine that all threads have been serviced. In this case, no pre-scheduled replay operations are required. If any pre-scheduled replay operations were inserted into the multi-stage pipeline 400, then the LSU 303 discards the pre-scheduled replays. In another example, the pre-scheduled replay operations inserted by the pre-scheduled replay unit 420 may be able to service those threads that did not execute the instruction during the processing of the initial operation. In this case, one more of the pre-scheduled replay operations served to reduce latency by being scheduled for execution serially with the initial operation. In another example, some threads may remain unserviced even after processing the initial operation and the pre-scheduled replay operations. In such a case, the pre-scheduled replay operations may have reduced the instruction's execution latency, but more operations may be required than could be processed by a single pass through the multi-stage pipeline 400. Threads selected for pre-scheduled replay operations may be selected in any technically feasible manner. Such threads are typically selected to increase the likelihood that the selected threads are not in the same thread family as any other selected thread while constraining the complexity of the pre-scheduled replay unit 420 in order to meet timing, power, and space requirements of the multi-stage pipeline 400.

The threads selected for pre-scheduled replay operations during the initial pass may represent thread families that actually required separate replay operations. In such a case, the pre-scheduled replay operation reduces or eliminates the number of replay operations through the replay loop 410, thus reducing overall execution latency. If threads selected for pre-scheduled replay operations have already been processed during the initial operation or a prior pre-scheduled replay operation, then the associated pre-scheduled replay operation is discarded. A person having ordinary skill in the art will understand how to evaluate the value of pre-scheduled replay operation versus the possible opportunity cost associated with delaying new operations.

The Exec Unit 302 may use any one or more of a number of approaches to determine whether to insert pre-scheduled replays into the multi-stage pipeline 400. For example, the pre-scheduled replay unit 420 may determine that a new instruction 412 will require a replay operation based on the instruction itself. If an instruction requires a 128-bit operand, but the common resource associated with the operand has a 64-bit data path, then the Exec Unit 302 knows that at least one replay operation will be required in order to retrieve 128-bits of data via the 64-bit data path. In such a case, the Exec Unit 302 may insert one pre-scheduled replay operation serially with the initial operation. In another example, the Exec Unit 302 may probabilistically determine that a pre-scheduled replay operation may be required by the new instruction 412. Certain instructions may have a high probability of requiring a replay operation. In such a case, the Exec Unit 302 may determine to insert one or more pre-scheduled replay operations serially with the initial operation given the likelihood that the pre-scheduled replays are actually utilized. If the LSU 303 later determines that the pre-scheduled replays were not needed, then the LSU 303 may discard the unused pre-scheduled replay operations. In another example, the new instruction 412 may include a command to generate one or more pre-scheduled replay operations associated with the new instruction 412. The commands may be inserted manually by a software programmer or automatically by the compiler at compile time. In such a case, predictive models available to the software programmer or to the compiler may indicate a high probability that one or more pre-scheduled replay operations are required by the associated instructions. In addition, the compiler may insert timing information via a "replay command" to schedule specific pre-scheduled replay operations to enter the multi-stage pipeline 400 at specific times relative to the new instruction 412. The pre-scheduled replay unit 420 may recognize the replay command inserted by the compiler within the new instruction 412 and insert pre-scheduled replay operations accordingly. Alternatively, the Exec Unit 302 may utilize any other technically feasible approach to determine whether to insert one or more pre-scheduled replay operations into the multi-stage pipeline.

The LSU 303 may utilize various approaches to prevent the replay unit 406 from repeating an operation that has already been inserted into the multi-stage pipeline 400 by the pre-scheduled replay unit 420. When the initial operation at arrives at logic element 404(S−1), the multi-stage pipeline 400 may not be aware that additional pre-scheduled replay operations have been inserted by the pre-scheduled replay unit 420. As a result, the LSU 303 may schedule unnecessary replay operations. To prevent such an occurrence, the Exec Unit 302 may insert an indicator associated with the initial operation to indicate that one or more pre-scheduled replay operations follow the initial operation. The LSU 303 may then wait until the pre-scheduled replay operations are processed before inserting additional replay operations. Alternatively, logic element 404(S−1) may include the same logic as used in the pre-scheduled replay unit 420 to create the pre-scheduled replay operations. In such a case, logic element 404(S−1) is able to determine the number and type of pre-scheduled replay operations inserted by the pre-scheduled replay unit 420. The LSU 303 then waits until the pre-scheduled replay operations clear the multi-stage pipeline 400 before determining whether additional replay operations should be scheduled. Alternatively, any technically feasible approach may be implemented by the LSU 303 to prevent the replay unit 406 from inserting replay operations that are duplicative of those inserted by the pre-scheduled replay unit 420.

The following example illustrates how pre-scheduled replay operations are processed in an exemplary multi-stage pipeline 400, where B=3. A new instruction 412 may enter the multi-stage pipeline 400 via the pre-scheduled replay unit 420. The Exec Unit 302 may determine that the instruction is programmed to execute a common resource access operation, such as a load instruction directed to a shared memory. The Exec Unit 302 inserts an operation into the multi-stage pipeline, via the pre-scheduled replay unit 420, to execute the instruction for the first thread and the first thread family. The LSU 303 may then insert the additional pre-scheduled replay operations, via the pre-scheduled replay unit 420, into the multi-stage pipeline 400 via input 418 of the replay multiplexer 408 serially with the initial operation. If the new instruction 412 is a common resource access operation, then the LSU 303 may select a first thread from among the group of threads scheduled to execute the instruction. The LSU 303 selects a thread family associated with the first thread. The LSU 303 may then select up to two additional threads to process during the initial pass through the multi-stage pipeline 400 from among the threads needing service. The LSU 303 may select thread families associated with each of the additional threads. The LSU 303 may create pre-scheduled replay operations associated with each of the additional threads. The LSU 303 may determine whether any threads will remain unserviced after the multi-stage pipeline 400 processes the initial operation and the pre-scheduled replay operations. The LSU 303 may insert additional replay operations via replay loop 410 until all threads have been serviced.

In this example, where the maximum pre-scheduled replay batch size B=3, and the length of replay loop 410 is five pipeline stages 402, a common resource access operation with two rescheduled replay operations may pass from pipeline stage 402(0) to 402(S) in a single pass of seven clock cycles, five clock cycles for the initial instruction plus one additional clock cycle for each of the two pre-scheduled replay operations. Without pre-scheduled replay operations, such an instruction requiring two replay operations may require fifteen clock cycles, five clock cycles for the initial instruction plus five clock cycles for each of the two replay operations. In this example, the number of clock cycles to complete the common resource access operation has been reduced by more than half.

It will be appreciated that the architecture described herein is illustrative only and that variations and modifications are possible. For example, the architecture described herein is presented in the context of a multi-stage pipeline 400 within the Exec Unit 302 and the load-store unit 303 of a streaming multiprocessor 310, but may be employed in any multi-stage pipeline 400 that accesses common resources, including, without limitation, in association with a central processing unit (CPU), general processing unit (GPU), or in any other technically feasible compute environment. In another example, greater efficiencies may be achieved where the maximum pre-scheduled replay batch size B is a number other than 3. A person having ordinary skill in the art will understand the optimum value for B may be determined by the length S of replay loop 410, the nature of instructions progressing through the multi-stage pipeline 400, and other factors. In yet another example, the initial operation and associated pre-scheduled replay operations are typically inserted into the multi-stage pipeline 400 at successive clock cycles such that operations within a batch progress through the multi-stage pipeline 400 one pipeline stage 402 apart from each other. However, successive insertions may occur at other intervals greater than one clock cycle.

The techniques described herein are described with respect to common resource access operations, such as load instructions across multiple threads where the threads access memory locations across divergent cache lines. The techniques are sufficiently flexible to be employed in other applications where divergent operations are present. In one example, the techniques described herein are not limited to execution of threads, but may be employed any operations which may proceed via multiple passes through one or more stages of a multi-stage pipeline. In another example, an instruction may diverge across a common resource other than cache lines within a cache. Such resources may include, without limitation, cache tags, cache data, register banks, and shared memory. The threads executing the instruction may diverge by accessing different aspects or portions of the common resource. In yet another example, the LSU 303 may retrieve multiple common resources, such as multiple cache lines, during any given operation. Pre-scheduled replay operations may still be employed where threads remain unserviced after an operation that has retrieved multiple common resources.

A person having ordinary skill in the art will understand the manner in which threads may be determined and selected for processing. In one example, the total number of threads and corresponding thread families may be determined in the same clock cycle. One or more threads may be tagged for processing in the current pass through the multi-stage pipeline 400 while the remaining threads remain unserviced until a later pass. In another example, a single thread may be selected during a given clock cycle. While this selected thread begins processing, a next thread, if any, may be selected during a following clock cycle. Thus, threads selected for pre-scheduled replay operations may be determined one at a time as needed until all threads are serviced. In addition to these two approaches, any technically feasible method of selecting threads and selecting associated thread families may be employed. Any reasonable criteria may be used to select a specific thread for processing. For example, a thread may be randomly selected from among the threads that require servicing. Alternatively, a thread may be selected based on which thread produces the largest thread family, or again in any other reasonable manner.

Figure 5:
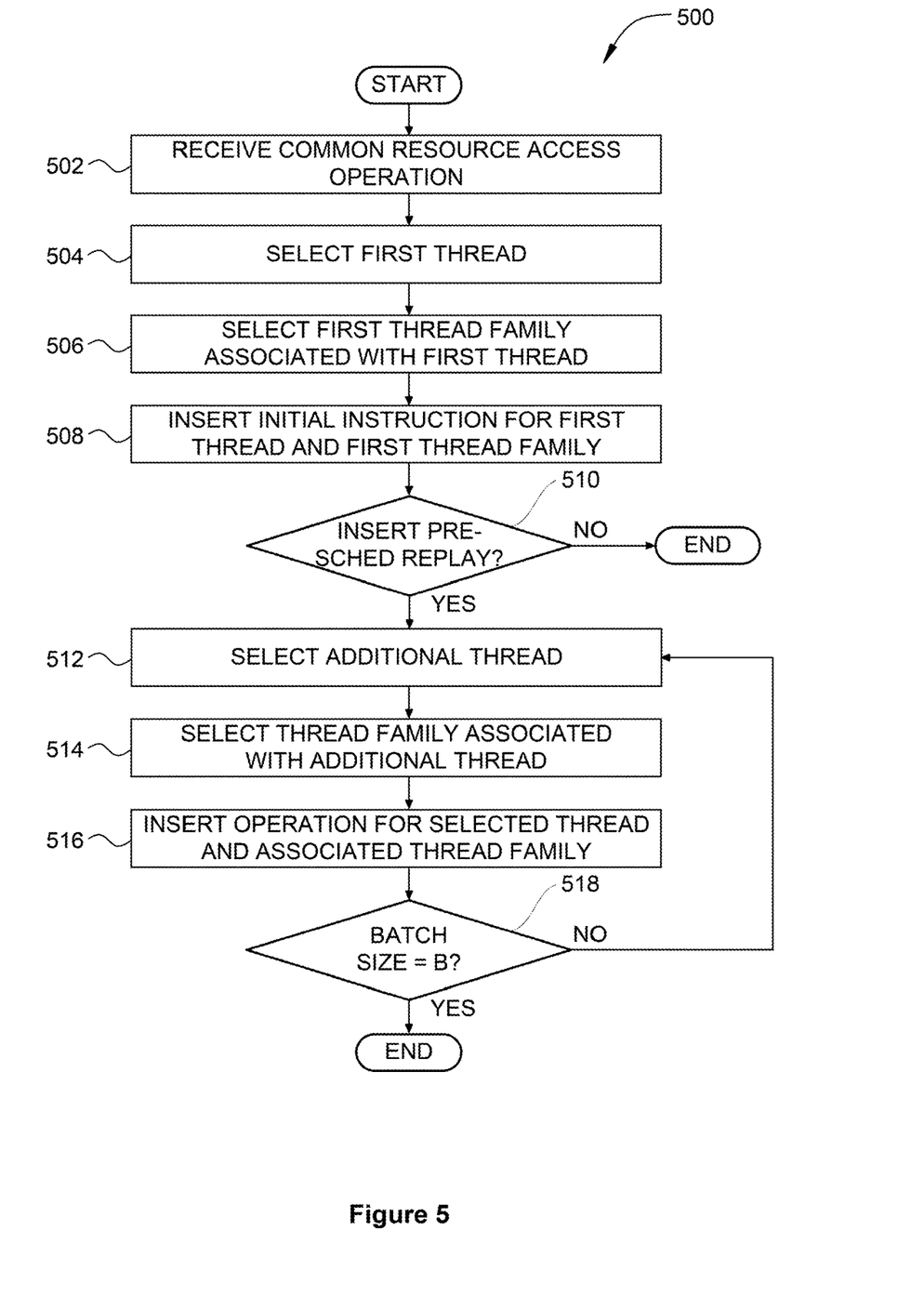
FIG. 5 is a flow diagram of method steps for executing pre-scheduled replay operations in a multi-stage pipeline, according to one embodiment of the present invention.

FIG. 5 is a flow diagram of method steps 500 for executing pre-scheduled replay operations in a multi-stage pipeline 400, according to one embodiment of the present invention. Although the method steps 500 are described in conjunction with the systems of FIGS. 1-4, persons of ordinary skill in the art will understand that any system configured to perform the method steps 500, in any order, is within the scope of the present invention.

The method 500 begins at step 502, where the SM 310 receives a common resource access operation such as an instruction to load a data value from a shared memory at a specified address for some number of threads. Each thread scheduled to execute the instruction may be programmed to load data from a different memory location which may be on the same or divergent cache lines. At step 504, the SM 310 selects a thread from among the various threads that require servicing to complete the common resource access operation. The thread may be selected based on a number of criteria or policies. At step 506, the SM 310 selects a first thread family associated with the first thread. The first thread family includes the set of threads that need to access the same portion or aspect of a common resource as the first thread, such as the same cache line within a cache memory. At step 508, the SM 310 inserts an initial operation into the multi-stage pipeline 400 configured to execute the instruction for the first thread and the first thread family. At step 510, the SM 310 determines whether to insert additional pre-scheduled operations serially with the initial instruction. If the SM 310 determines not to insert pre-scheduled operations, then the method 500 terminates. If the SM 310 determines to insert pre-scheduled operations, then the method 500 proceeds to step 512, where the SM 310 selects an additional thread from among the threads scheduled to execute the instruction. At step 514, the SM 310 selects a thread family associated with the additional thread. At step 516, the SM 310 inserts a pre-scheduled replay operation into the multi-stage pipeline 400 configured to execute the instruction for the selected thread and the associated thread family.

At step 518, the SM 310 determines whether the batch size, including the initial instruction and each of the pre-scheduled replay operations, is equal to B, where B is the maximum number of operations that may be processed during the initial pass through the multi-stage pipeline 400, inclusive of the initial instruction. If the batch size is not equal to B, then the method 500 returns to step 512, where the SM 310 selects an additional thread. If the batch size is equal to B, then the method 500 terminates.

In sum, the disclosed technique provides an optimized way to execute replay operations for divergent operations in a parallel processing subsystem. Specifically, a streaming multiprocessor (SM) 310 includes a multi-stage pipeline 400 configured to insert one or more pre-scheduled replay operations into a multi-stage pipeline 400. A pre-scheduled replay unit 420 detects whether the operation associated with the current instruction is accessing a common resource, such as loading data from a shared memory. If the threads are accessing data which are distributed across multiple common resources, such as divergent cache lines, then the pre-scheduled replay unit 420 inserts pre-scheduled replay operations behind the initial operation to execute the current instruction. The multi-stage pipeline 400 executes the initial operation and the pre-scheduled replay operations sequentially. If additional threads remain unserviced after execution of the initial operation and the pre-scheduled replay operations, then additional replay operations are inserted via the replay loop 410, until all threads are serviced.

Advantageously, divergent operations requiring one or more replay operations execute with reduced latency. The multi-stage pipeline 400 is utilized more efficiently because one or more pre-scheduled replay operations progress through the multi-stage pipeline 400 serially along with initial instructions. Additionally, new instructions 412 waiting to enter the multi-stage pipeline 400 at the insertion point experience reduced delay caused by instructions requiring replay operations. Further, the number and timing of pre-scheduled replay operations may be determined at compile time, resulting in further efficiencies versus determining pre-scheduled replay operations exclusively within the multi-stage pipeline 400 at the time of instruction execution.

While the foregoing is directed to embodiments of the present invention, other and further embodiments of the invention may be devised without departing from the basic scope thereof, and the scope thereof is determined by the claims that follow.

What is claimed is:

1. A computer-implemented method for pre-scheduling replay of a common resource access operation, the method comprising:
   receiving a first instruction that is to be executed by a group of threads in a multi-stage pipeline;
   prior to inserting the first instruction into the multi-stage pipeline for execution, determining that a pre-scheduled replay operation should be inserted into the multi-stage pipeline;
   selecting a first set of one or more threads from the group of threads to execute the first instruction in the multi-stage pipeline;
   inserting the first instruction into the multi-stage pipeline for execution by the first set of one or more threads during a first pass through the multi-stage pipeline;
   prior to inserting the pre-scheduled replay operation into the multi-stage pipeline, executing the first instruction in the multi-stage pipeline via the first set of one or more threads; and
   while the first set of one or more threads is executing the first instruction in the multi-stage pipeline, inserting the pre-scheduled replay operation into the multi-stage pipeline to allow a second set of one or more threads from the group of threads to execute the first instruction during the first pass through the multi-stage pipeline,
   wherein the first set of one or more threads is intended to access a first aspect or portion of a common resource, and the second set of one or more threads is intended to access a second aspect or portion of the common resource.

2. The method of claim 1, wherein the common resource comprises a memory cache.

3. The method of claim 1, further comprising inserting into the multi-stage pipeline an identifier corresponding to the pre-scheduled replay operation, wherein the identifier indicates the existence of one or more pre-scheduled replay operations.

4. The method of claim 1, wherein the pre-scheduled replay operation is inserted into the multi-stage pipeline serially relative to the first instruction.

5. The method of claim 1, wherein a second instruction is inserted into the multi-stage pipeline serially relative to the pre-scheduled replay operation.

6. The method of claim 1, wherein the first instruction indicates that at least one pre-scheduled replay operation should be inserted into the multi-stage pipeline.

7. The method of claim 1, wherein the pre-scheduled replay operation is required to execute the first instruction for all threads within the group of threads.

8. The method of claim 1, wherein the pre-scheduled replay operation is likely to be required to execute the first instruction for all threads within the group of threads.

9. A subsystem for pre-scheduling replay of a common resource access operation, comprising:
   a streaming multiprocessor configured to:
      receive a first instruction that is to be executed by a group of threads in a multi-stage pipeline;
      prior to inserting the first instruction into the multi-stage pipeline for execution, determine that a pre-scheduled replay operation should be inserted into the multi-stage pipeline;
      select a first set of one or more threads from the group of threads to execute the first instruction in the multi-stage pipeline;
      insert the first instruction into the multi-stage pipeline for execution by the first set of one or more threads during a first pass through the multi-stage pipeline;
      prior to inserting the pre-scheduled replay operation into the multi-stage pipeline, executing the first instruction in the multi-stage pipeline via the first set of one or more threads; and
      while the first set of one or more threads is executing the first instruction in the multi-stage pipeline, insert the pre-scheduled replay operation into the multi-stage pipeline to allow a second set of one or more threads from the group of threads to execute the first instruction during the first pass through the multi-stage pipeline,
      wherein the first set of one or more threads is intended to access a first aspect or portion of a common resource, and the second set of one or more threads is intended to access a second aspect or portion of the common resource.

10. The subsystem of claim 9, wherein the common resource comprises a memory cache.

11. The subsystem of claim 9, further comprising inserting into the multi-stage pipeline an identifier corresponding to the pre-scheduled replay operation, wherein the identifier indicates the existence of one or more pre-scheduled replay operations.

12. The subsystem of claim 9, wherein the pre-scheduled replay operation is inserted into the multi-stage pipeline serially relative to the first instruction.

13. The subsystem of claim 9, wherein a second instruction is inserted into the multi-stage pipeline serially relative to the pre-scheduled replay operation.

14. The subsystem of claim 9, wherein the first instruction indicates that at least one pre-scheduled replay operation should be inserted into the multi-stage pipeline.

15. The subsystem of claim 9, wherein the pre-scheduled replay operation is required to execute the first instruction for all threads within the group of threads.

16. The subsystem of claim 9, wherein the pre-scheduled replay operation is likely to be required to execute the first instruction for all threads within the group of threads.

17. A computing device, comprising:
a subsystem that includes a streaming multiprocessor configured to:
receive a first instruction that is to be executed by a group of threads in a multi-stage pipeline;
prior to inserting the first instruction into the multi-stage pipeline for execution, determine that a pre-scheduled replay operation should be inserted into the multi-stage pipeline
select a first set of one or more threads from the group of threads to execute the first instruction in the multi-stage pipeline;
insert the first instruction into the multi-stage pipeline for execution by the first set of one or more threads during a first pass through the multi-stage pipeline;
prior to inserting the pre-scheduled replay operation into the multi-stage pipeline, executing the first instruction in the multi-stage pipeline via the first set of one or more threads; and
while the first set of one or more threads is executing the first instruction in the multi-stage pipeline, insert the pre-scheduled replay operation into the multi-stage pipeline to allow a second set of one or more threads from the group of threads to execute the first instruction during the first pass through the multi-stage pipeline,
wherein the first set of one or more threads is intended to access a first aspect or portion of a common resource, and the second set of one or more threads is intended to access a second aspect or portion of the common resource.

18. The computing device of claim 17, wherein the first instruction indicates that at least one pre-scheduled replay operation should be inserted into the multi-stage pipeline.

19. The computing device of claim 17, wherein the pre-scheduled replay operation is required to execute the first instruction for all threads within the group of threads.

20. The computing device of claim 17, wherein the pre-scheduled replay operation is likely to be required to execute the first instruction for all threads within the group of threads.

21. The method of claim 1, wherein the second set of one or more threads remains unserviced after the first set of one or more threads executes the first instruction.

* * * * *